United States Patent
Binder et al.

(10) Patent No.: US 11,931,834 B2
(45) Date of Patent: Mar. 19, 2024

(54) METHOD FOR REGULATING OR CONTROLLING THE CONVEYANCE SPEED OF A WIRE COMPOSED OF CONSUMABLE MATERIAL DURING A LASER SOLDERING OR LASER WELDING METHOD, AND LASER SOLDERING OR LASER WELDING DEVICE FOR CARRYING OUT SUCH A METHOD

(71) Applicant: FRONIUS INTERNATIONAL GMBH, Pettenbach (AT)

(72) Inventors: Manuel Binder, Pettenbach (AT); Andreas Waldhör, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 18/035,796

(22) PCT Filed: Apr. 14, 2022

(86) PCT No.: PCT/EP2022/059983
§ 371 (c)(1),
(2) Date: May 8, 2023

(87) PCT Pub. No.: WO2022/223419
PCT Pub. Date: Oct. 27, 2022

(65) Prior Publication Data
US 2023/0405702 A1 Dec. 21, 2023

(30) Foreign Application Priority Data
Apr. 19, 2021 (EP) .................................... 21169172

(51) Int. Cl.
*B23K 9/10* (2006.01)
(52) U.S. Cl.
CPC ................... *B23K 9/1093* (2013.01)

(58) Field of Classification Search
CPC ...... B23K 9/1093; B23K 26/14; B23K 26/70; B23K 1/0056; B23K 26/702; B23K 26/1464
See application file for complete search history.

(56) References Cited

U.S. PATENT DOCUMENTS

| 4,467,176 A | * | 8/1984 | Mizuno | ................ | B23K 9/1093 |
| | | | | | 219/137.71 |
| 5,528,010 A | * | 6/1996 | Herwig | ................ | B23K 9/0734 |
| | | | | | 427/446 |

(Continued)

FOREIGN PATENT DOCUMENTS

| CN | 101421068 A | 4/2009 |
| CN | 102149501 A | 8/2011 |

(Continued)

OTHER PUBLICATIONS

International Search Report in PCT/EP2022/059983, dated Sep. 1, 2022.

(Continued)

*Primary Examiner* — Brian W Jennison
(74) *Attorney, Agent, or Firm* — Collard & Roe, P.C.

(57) ABSTRACT

In a method for regulating or controlling the conveyance speed of a wire composed of consumable material during a laser soldering or welding method, the wire is melted by a laser beam from a laser unit and is conveyed at a mean conveyance speed toward a workpiece to be processed, wherein a voltage between the wire and the workpiece is measured. A laser soldering or laser welding device carries out this method. In order to avoid at least relatively lengthy short-circuit breaking between the end of the wire and the workpiece, the conveyance speed of the wire, as a function of the measured voltage, is temporarily increased to a predetermined boost speed by increasing the conveyance speed to the predetermined boost speed when a defined (Continued)

voltage limit value is exceeded, and the conveyance speed is reduced again at the latest when the voltage limit value falls below.

14 Claims, 10 Drawing Sheets

(56) References Cited

U.S. PATENT DOCUMENTS

| | | | |
|---|---|---|---|
| 6,596,962 | B2 | 7/2003 | Haschke |
| 8,389,900 | B2 | 3/2013 | Artelsmair et al. |
| 8,513,568 | B2 | 8/2013 | Kawamoto et al. |
| 8,809,735 | B2 | 8/2014 | Kawamoto et al. |
| 8,841,581 | B2 | 9/2014 | Kawamoto et al. |
| 9,085,041 | B2 * | 7/2015 | Peters .................... B23K 9/125 |
| 9,095,928 | B2 | 8/2015 | Ash et al. |
| 10,137,521 | B2 | 11/2018 | Raudsepp et al. |
| 10,661,371 | B2 | 5/2020 | Waldhoer et al. |
| 10,675,699 | B2 * | 6/2020 | Hsu ...................... B23K 9/1093 |
| 11,020,813 | B2 * | 6/2021 | Will ...................... B23K 9/1093 |
| 11,135,670 | B2 | 10/2021 | Raudsepp et al. |
| 2010/0176109 | A1 | 7/2010 | Peters |
| 2013/0092667 | A1 | 4/2013 | Peters et al. |
| 2021/0237191 | A1 | 8/2021 | Soellinger et al. |

FOREIGN PATENT DOCUMENTS

| | | |
|---|---|---|
| CN | 104411439 A | 3/2015 |
| CN | 104428099 A | 3/2015 |
| CN | 104661781 A | 5/2015 |
| CN | 109079325 A | 12/2018 |
| CN | 109641298 A | 4/2019 |
| CN | 109807417 A | 5/2019 |
| CN | 110625260 A | 12/2019 |
| CN | 112423926 A | 2/2021 |
| DE | 44 12 093 A1 | 10/1995 |
| EP | 1 125 672 A2 | 8/2001 |
| EP | 3 170 613 A2 | 5/2017 |
| EP | 3 560 649 A1 | 10/2019 |
| WO | 2014/013322 A2 | 1/2014 |

OTHER PUBLICATIONS

European Search Report dated Nov. 3, 2021 in European Application No. 21169172.0 with English translation of relevant parts.
Chinese Office Action dated Dec. 7, 2023 in Chinese Application No. 202280009224.1, with English translation.

* cited by examiner

METHOD FOR REGULATING OR CONTROLLING THE CONVEYANCE SPEED OF A WIRE COMPOSED OF CONSUMABLE MATERIAL DURING A LASER SOLDERING OR LASER WELDING METHOD, AND LASER SOLDERING OR LASER WELDING DEVICE FOR CARRYING OUT SUCH A METHOD

CROSS REFERENCE TO RELATED APPLICATIONS

This application is the National Stage of PCT/EP2022/059983 filed on Apr. 14, 2022, which claims priority under 35 U.S.C. § 119 of European Application No. 21169172.0 filed on Apr. 19, 2021, the disclosure of which is incorporated by reference. The international application under PCT article 21(2) was not published in English.

The invention relates to a method for regulating or controlling the conveyance speed of a wire composed of consumable material during a laser soldering or laser welding method, wherein the wire is melted by a laser beam from a laser unit and is conveyed at a mean conveyance speed in the direction of a workpiece to be processed, wherein a voltage between the wire and the workpiece is measured.

The invention also relates to a laser soldering or laser welding device, having a laser unit for melting a wire of consumable material, a wire conveyance device for conveying the wire at an conveyance speed in the direction of a workpiece to be processed, and having a circuit for measuring the voltage between the wire and the workpiece.

The invention relates to laser soldering and laser welding methods in which the wire made of consumable material is automatically moved to the focal point of the laser, where the material of the wire is melted and used to connect at least two workpieces or to coat the surface or to additively finish a workpiece. In contrast to laser welding, in which the material of the workpieces to be joined or of the workpiece to be coated is also melted, there is no substantial melting of the material of the workpiece during laser soldering. When the wire of consumable material is preheated, the melting power can be increased. This is referred to as hot wire applications (hot wire soldering or hot wire welding) in contrast to cold wire applications (cold wire soldering or cold wire welding), in which the filler material is not preheated.

In laser soldering and laser welding, it is very important to keep the conveyance speed of the wire constant and to keep the consumable filler material always in contact with the fluid molten bath. This is necessary in order to keep the soldering or welding process stable, to maintain the hot wire current and to avoid the short-circuiting with the formation of an arc in any case. The short-circuiting during the soldering or welding process can lead to a wide variety of defects in the weld seam or soldered seam, such as, for example, pores, holes, irregular material introduction or application, thermal irregularities, optical irregularities, different weld penetration, structural defects, etc. In particular, in the case of a change in position of the soldering or welding robot or of the workpiece vertical to the workpiece or in the case of incorrect parameter settings, such as, e.g., an excessively high current for preheating the wire in hot wire applications, an undesirable short-circuiting between wire and molten bath can occur. By using a special laser soldering or laser welding head with a leading tactile sensor that controls the position of the welding head, a short-circuiting due to changes in the position of the welding head with respect to the workpiece can be prevented. However, disturbances in the soldering or welding process due to incorrect or unsuitable parameter settings or changes in the thermal conditions during the soldering or welding process cannot be prevented in this way.

DE 44 12 093 A1 discloses a method and a device for regulating a laser welding machine, wherein, in order to ensure precise guidance of the laser welding machine, even in the case of uneven workpiece surfaces, the focusing head together with the conveyance device for the welding wire is moved perpendicularly to the workpiece via a feed motor.

EP 1 125 672 A2 describes a method and a device for joining workpiece parts by means of a laser beam, in which the wire is used as a mechanical feeler element, with the wire tip being guided along the workpiece surface in a frictional manner.

EP 3 560 649 A1 describes a hot wire welding method in which various welding parameters are used to control the position of the workpiece to the laser unit and to preheat the wire.

EP 3 170 613 A2 describes a laser welding method in which the wire is preheated. When a contact of the wire with the workpiece is detected, the conveyance is stopped. In addition, the force on the wire is measured and, with increasing force, the heating power of the wire is increased and, with decreasing force, the heating power is reduced.

U.S. Pat. No. 4,467,176 A likewise describes a hot wire application, wherein the conveyance speed of the wire and the current supplied for heating the wire are correspondingly regulated such that they increase synchronously with one another over time.

In a laser soldering method, US 2010/0176109 A1 discloses the regulation of an electrical heating current as a function of contact between the end of the wire and the workpiece. The contact of the wire is detected by the voltage between the wire and the workpiece.

Finally, US 2013/092667 A1 describes a laser welding method wherein the heating power of the wire is controlled accordingly to prevent the short-circuiting and the formation of an arc between the wire and the workpiece.

The object of the present invention is to provide the above mentioned method for regulating or controlling the conveyance speed of a wire of consumable material in a laser soldering or laser welding method and a laser soldering or laser welding device, which ensure in a simple manner, that the wire of consumable material dips as permanently as possible into the molten bath and effectively prevents at least a prolonged short-circuiting and the formation of an arc. The result achieved with the laser soldering or laser welding method should be of the highest possible quality. The invention is to be usable both in methods without preheating of the wire (cold wire application) and in methods with preheating of the wire (hot wire application). Disadvantages of known methods or devices are to be avoided or at least reduced.

The object according to the invention is achieved in terms of method by temporarily increasing, the conveyance speed of the wire to a predetermined boost speed as a function of the measured voltage, by increasing the conveyance speed of the wire to the predetermined boost speed when a defined voltage limit value is exceeded, and reducing the conveyance speed of the wire again at the latest when the voltage limit value falls below. By temporarily increasing the conveyance speed as a function of the measured voltage between the wire and the workpiece, the short-circuiting between the wire and the workpiece can be prevented or at least it can be ensured that the short-circuit lasts only for very short periods of time and is then closed again. In the case of a short-circuit occurring, the voltage as well as the resistance drop in real time and in the case of a short-circuiting, the voltage as well as the resistance rise in real time. Thus, voltage and resistance are ideal real-time metrics for determining whether a short-circuit is present or not. Furthermore, such a real-time metrics, such as the voltage or the resistance, can be used for real-time regulation or control without great effort. The method can be used in cold wire applications as well as in hot wire applications and is very easy to implement. In hot wire applications, the usually present electronic circuit for inducing a current into the wire can also be used for measuring the voltage between the wire and the workpiece. In the case of cold wire applications, the circuit for measuring the voltage between the wire and the workpiece must be added if necessary. As a result of the continuous measurement and evaluation of the voltage between the wire and the workpiece and, if necessary, the temporary increase in the conveyance speed of the wire to the predetermined boost speed, the so-called boost process, it is possible to prevent at least prolonged short-circuits. The faster the voltage measurement and the more dynamically the wire conveyance is carried out, the shorter the duration of any short-circuiting between the wire and the workpiece can be kept. Optimum results can be achieved in particular with so-called highly dynamic drive motors for conveying the wire, i.e. motors with very high acceleration and speed. Optimum values can be achieved with modern direct drives without gears. The predetermined conveyance speed of the wire can also be continuously compared with the actual conveyance speed and the conveyance speed can thus be controlled or set or predetermined without regulation as in the case of a regulation.

The fact that the conveyance speed of the wire is increased to the predetermined boost speed when a defined voltage limit value is exceeded, and the conveyance speed of the wire is reduced again at the latest when the voltage limit value falls below, represents a variant of the method that is easy to carry out. The voltage limit value is selected in such a way that a short-circuiting is identified as quickly as possible but also as reliably as possible.

According to a further feature of the invention, it is provided that the conveyance speed is increased to a predetermined boost speed, which is on average at least 50% above the mean conveyance speed before the increase. This represents a value for the boost speed that is acceptable in practice. Of course, it is advantageous if the boost speed is as high as possible and the change in speed, that is to say the acceleration, is also as high as possible. However, these requirements are also reflected in a usually higher outlay for the drive for the wire conveyor. In particular, values of at least 10 m/min for the boost speed and speed changes of at least 2000 m/min/s are advantageous.

In a hot wire method, a current is introduced into the wire for preheating the wire, and a resulting voltage is measured, wherein the conveyance speed is temporarily increased to the predetermined boost speed as a function of this measured voltage. As already mentioned above, in the hot wire method, the current for preheating the wire and the preheating voltage thus present can be used as the measuring voltage between the wire and the workpiece, as a result of which the outlay for the method can be kept very low.

The current through the wire can also be measured, and a resistance can be determined from the measured voltage and the measured current, and if a resistance limit value is exceeded, the conveyance speed can be increased to the predetermined boost speed, and the conveyance speed can be reduced again at the latest when the resistance falls below the limit value. This represents a further embodiment of the method in which it is possible to react just as quickly to impending short-circuiting between the wire and the molten bath.

Advantageously, the conveyance speed is reduced at least once by a predetermined conveyance speed amount a predetermined period of time after the increase to the boost speed. In this case, after the increase to the boost speed, the conveyance speed is gradually reduced with one or more steps, instead of the conveyance speed being immediately reduced again to the value before the increase to the boost speed. By gradually reducing the wire conveyance speed more slowly, the duration of a short circuit can be further reduced because there is less overshoot and possibly less undershoot in the conveyance speed.

According to a further feature of the invention, the conveyance speed is reduced again to the mean conveyance speed before the increase when the voltage limit value or the resistance limit value falls below. As soon as a short circuit between the wire and the workpiece is identified again, the conveyance speed is adjusted according to the values before the short-circuiting.

Further improvements in the laser soldering or laser welding method can be achieved by reducing or setting the conveyance speed to a mean conveyance speed increased by a predetermined conveyance speed amount when the voltage limit value or the resistance limit value falls below. As a result of this measure, certain process parameters can be automatically adapted in the case of undesired positional deviations of the component or incorrectly set thermal conditions of the soldering or welding process. By increasing the conveyance speed by a predetermined amount after each boost process, an adaptation can be achieved after only a few short-circuit occurrences and future further short-circuiting can be prevented. The respective conveyance speed amount by which the conveyance speed is increased after a short-circuiting is selected or determined in accordance with the respective conditions or is calculated automatically on the basis of algorithms.

After a defined period of time has elapsed, the mean conveyance speed increased by the conveyance speed amount can be reduced at least once by a predetermined conveyance speed amount until the mean conveyance speed is reached again. Through this measure, the conveyance speed returns to the originally set and selected values at least after a certain period of time. As a result, the laser soldering or laser welding method can be resumed with the original settings after a brief perturbation of the position or process parameters.

In the case of a hot wire application, the current through the wire can additionally be regulated or controlled by reducing the current to the boost speed after increasing the conveyance speed. The higher the current flow through the wire, the higher the melting power of the wire, and the sooner it can be regulated or controlled towards a short-circuiting. The lower the current flow through the wire, the lower the melting power of the wire, and the sooner it can be regulated or controlled towards a short circuit. By gradually lowering the current for preheating the wire, the so-called hot wire current adaptation, after each short-circuit or boost process, an adaptation of the process parameters is achieved and future short-circuits are even more likely to be prevented. The current is preferably reduced by a predetermined and defined amount of current, which can be determined depending on the process.

If, in addition, the conveyance speed of the wire is detected and a noise signal is generated therefrom, and if a noise signal threshold is exceeded, the regulation or control of the conveyance speed is deactivated, a faulty detection of a short circuit can be prevented and the method can be made even more reliable. As a result, interferences can be reduced and erroneous triggering of the boost process by incorrect short-circuit detections can be avoided.

If a warning is issued when the noise signal threshold is exceeded, the user of the method can be informed about the quality of the wire conveyance and, in the case of inadmissibly high noise signals, a stopping of the laser soldering or laser welding process can also be recommended or carried out.

The object according to the invention is also achieved by an above-mentioned laser soldering or laser welding device which has a regulating or control device which is designed to carry out the method described above. Such a device can be made with relatively little effort. Particularly in the case of hot wire applications, the device, which is present anyway, for applying a current to the wire can also be used for detecting the voltage between the wire and the workpiece for detecting the short circuit. But even in the case of cold wire applications, the effort is kept within limits.

It is important here that the detection of the short circuit takes place as quickly as possible and that the regulation or control of the conveyance speed also takes place with the highest possible acceleration. Reference is made to the above description of the method with regard to further advantages which can be achieved thereby.

Advantageously, the wire conveyance device is formed by a gearless direct drive. By means of such a direct drive, particularly rapid regulation or control of the conveyance speed with a high acceleration is possible.

According to one feature of the invention, the wire conveyance device is designed for conveying the wire at an conveyance speed of at least 10 m/min and preferably at a speed change of at least 2000 m/min/s. Such highly dynamic drives are particularly suitable for carrying out the method according to the invention.

The present invention is further explained with reference to the appended drawings. In the drawings.

Figure 1:
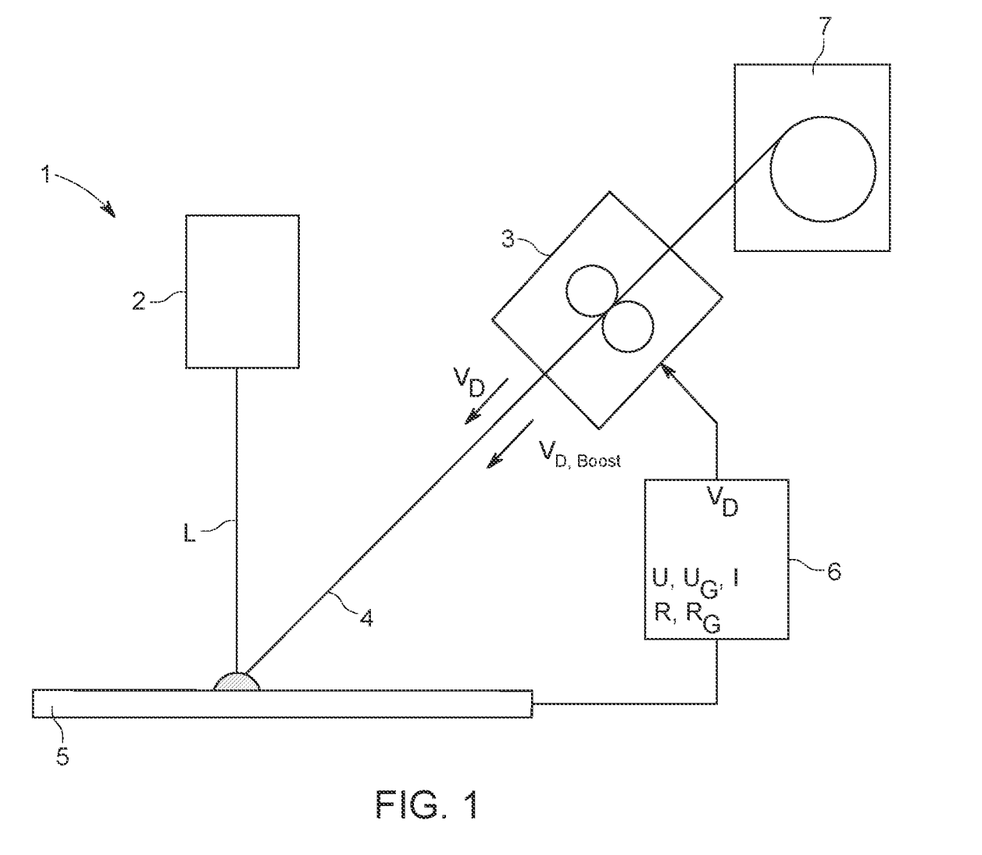
FIG. 1 shows a schematic block diagram of a laser soldering or laser welding device with a regulation or control of the conveyance speed of the wire of consumable material.

In FIG. 1, a schematic block diagram of a laser soldering or laser welding device 1 with a regulation or control of the conveyance speed $v_D$ of the wire 4 of consumable material is represented. The wire 4 of consumable material is melted by the laser beam L of a laser unit 2 in order to connect at least two workpieces 5 to one another or to produce a coating on a workpiece 5 or to use it for the additive finish of a workpiece 5. To this end, the wire 4 is conveyed by a wire drum 7 via a wire conveyance device 3 at a predetermined conveyance speed $v_D$ into the focal point or point of incidence of the laser beam L on the workpiece 5, where it is melted by the energy of the laser beam L. During laser welding, melting of the material of the at least one workpiece 5 also occurs, while during laser soldering, no substantial melting of the material of the workpiece 5 occurs. In addition, the wire 4 can be preheated by a current I, which is applied to the wire 4 in the wire conveyance device 7 (hot wire soldering or hot wire welding). In laser soldering and laser welding, it is very important for the process stability to keep the conveyance speed $v_D$ of the wire 4 constant and to keep the wire 4 always in contact with the fluid molten bath. According to the invention, the conveyance speed $v_D$ of the wire 4 is temporarily increased to a predetermined boost speed $v_{D,Boost}$ in a regulating or control device 6 as a function of the measured voltage U between the wire 4 and the workpiece 5. Advantageously, when a defined voltage limit value $U_G$ of the voltage U between the wire 4 and the workpiece 5 is exceeded, the conveyance speed $v_D$ of the wire 4 is increased to the predetermined boost speed $v_{D,Boost}$, and at the latest when the voltage limit value $U_G$ falls below, the conveyance speed $v_D$ of the wire 4 is again reduced. By also taking into account the current I through the wire 4, a resistance R can also be determined and, when a resistance limit value $R_G$ is exceeded, the conveyance speed $v_D$ can be increased to the predetermined boost speed $v_{D,Boost}$ and the boost process can be carried out.

Figure 2:
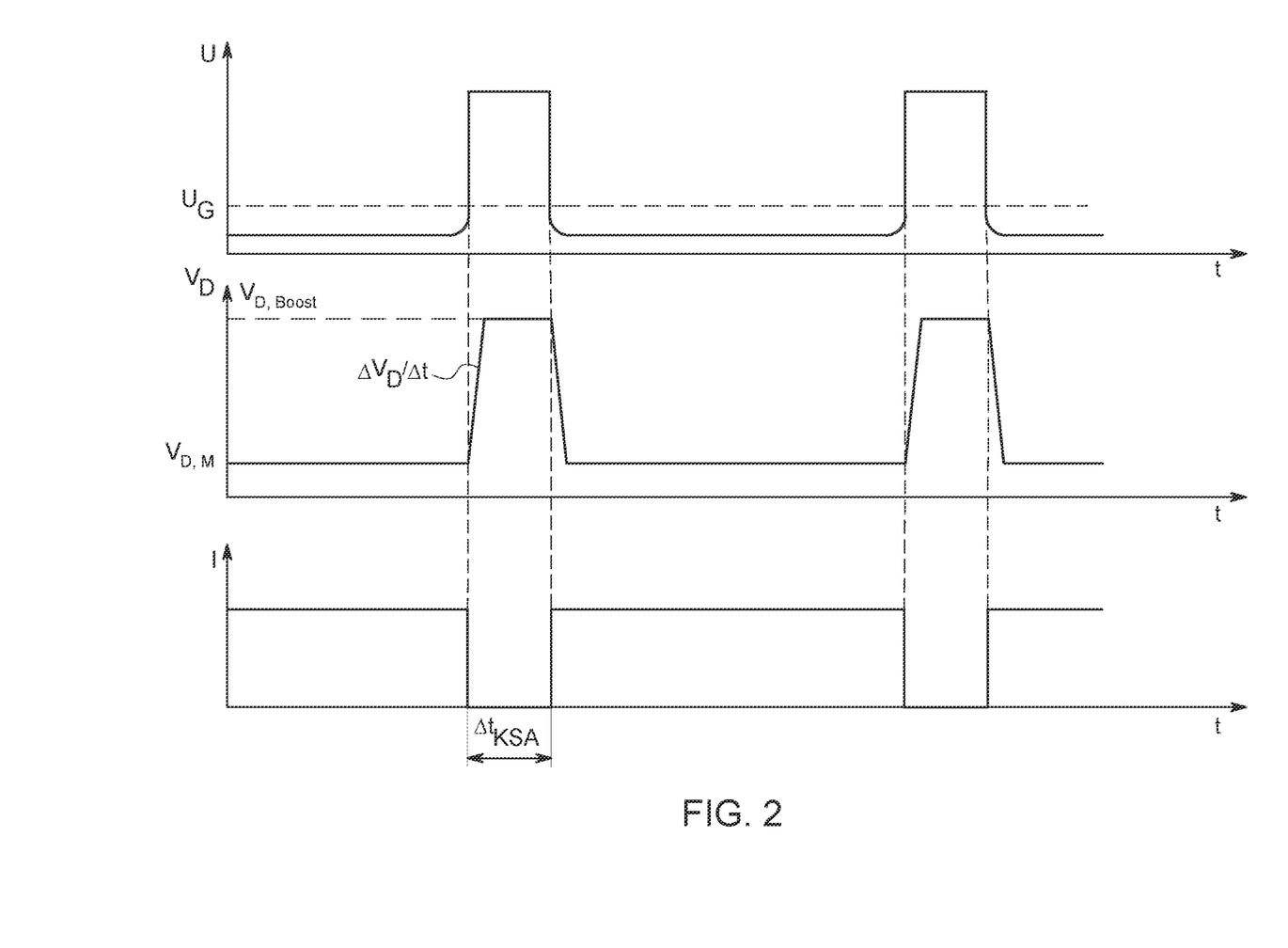
FIG. 2 shows the time profiles of the voltage, the conveyance speed and the current on the wire according to a first embodiment of the invention.

FIG. 2 shows the time profiles of the voltage U, the conveyance speed $v_D$ and the current I on the wire 4 according to a first embodiment of the invention. By measuring the voltage U between the wire 4 and the workpiece 5, an undesired short-circuiting can be detected. For example, the short-circuiting can be determined when a defined voltage limit value $U_G$ is exceeded. The short-circuiting is also evident from a drop of the current I through the wire 4 shown here. However, the measurement of the current I is not absolutely necessary. Depending on the measured voltage U and here with the defined voltage limit value $U_G$ being exceeded, the conveyance speed $v_D$ of the wire 4 is temporarily increased to a predetermined boost speed $v_{D,Boost}$, wherein the boost speed $v_{D,Boost}$ is at least 50% above the mean conveyance speed $v_{D,M}$ before the increase, in particular is at least 10 m/min. In the example shown, the boost speed $v_{D,Boost}$ is many times higher than the mean conveyance speed $v_{D,M}$ before the increase, which, however, requires a corresponding wire conveyance device. The increase of the conveyance speed $v_D$ to the boost speed $v_{D,Boost}$ preferably takes place as quickly as possible, i.e. with the highest possible acceleration, preferably with a speed change $\Delta v_D/\Delta t$ of at least 2000 m/min/s. As a result, the short-circuiting is effectively counteracted, as a result of which it can be terminated again after a duration $\Delta t_{KSA}$, which was shown disproportionally long in the exemplary embodiment. The recurrence of the short circuit is identified by a collapse of the measured voltage U and a drop below the defined voltage limit value $U_G$, whereupon the conveyance speed $v_D$ is reduced again. Here, after the short-circuiting and the boost process, the conveyance speed $v_D$ is again reduced to that mean conveyance speed $v_{D,M}$ of the wire 4 which was set before the short-circuiting. As a result of various events, such as, for example, an external disturbance of the laser soldering or laser welding process (e.g., a fluctuation in the height position, a current I set too high for preheating the wire 4, fluctuations in the soldering or welding speed, etc.), a short-circuiting can again occur, as can be seen in the time diagrams. As soon as a further short-circuiting is detected, a boosting process and an increase of the conveyance speed $v_D$ of the wire to the boost speed $v_{D,Boost}$ takes place again, as a result of which the duration $\Delta t_{KSA}$ of the short-circuiting can be kept very short.

Figure 3:
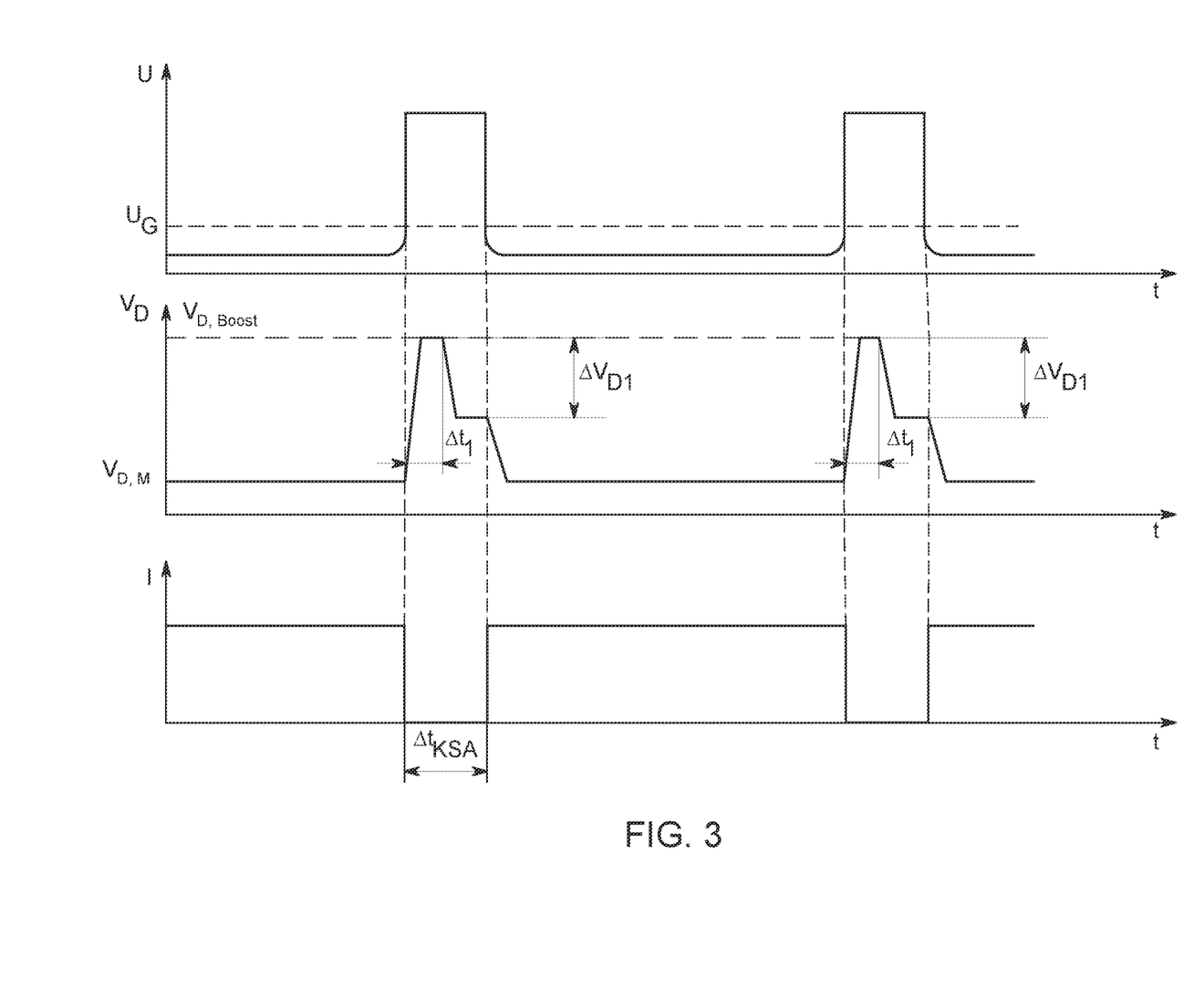
FIG. 3 shows the time profiles of the voltage, the conveyance speed and the current on the wire according to a second embodiment of the invention.

FIG. 3 shows the time profiles of the voltage U, the conveyance speed $v_D$ and the current I on the wire 4 according to a second embodiment of the invention. In this case, in contrast to the first embodiment according to FIG. 2, in the case of a short-circuiting, the conveyance speed $v_D$ is reduced by a predetermined conveyance speed amount $\Delta v_{D1}$ a predetermined period of time $\Delta t_1$ after the increase to the boost speed $v_{D,Boost}$. By such a stepwise reduction of the conveyance speed $v_D$, a smoother speed reduction and a reduction of overshoot or undershoot can be achieved.

Figure 4:
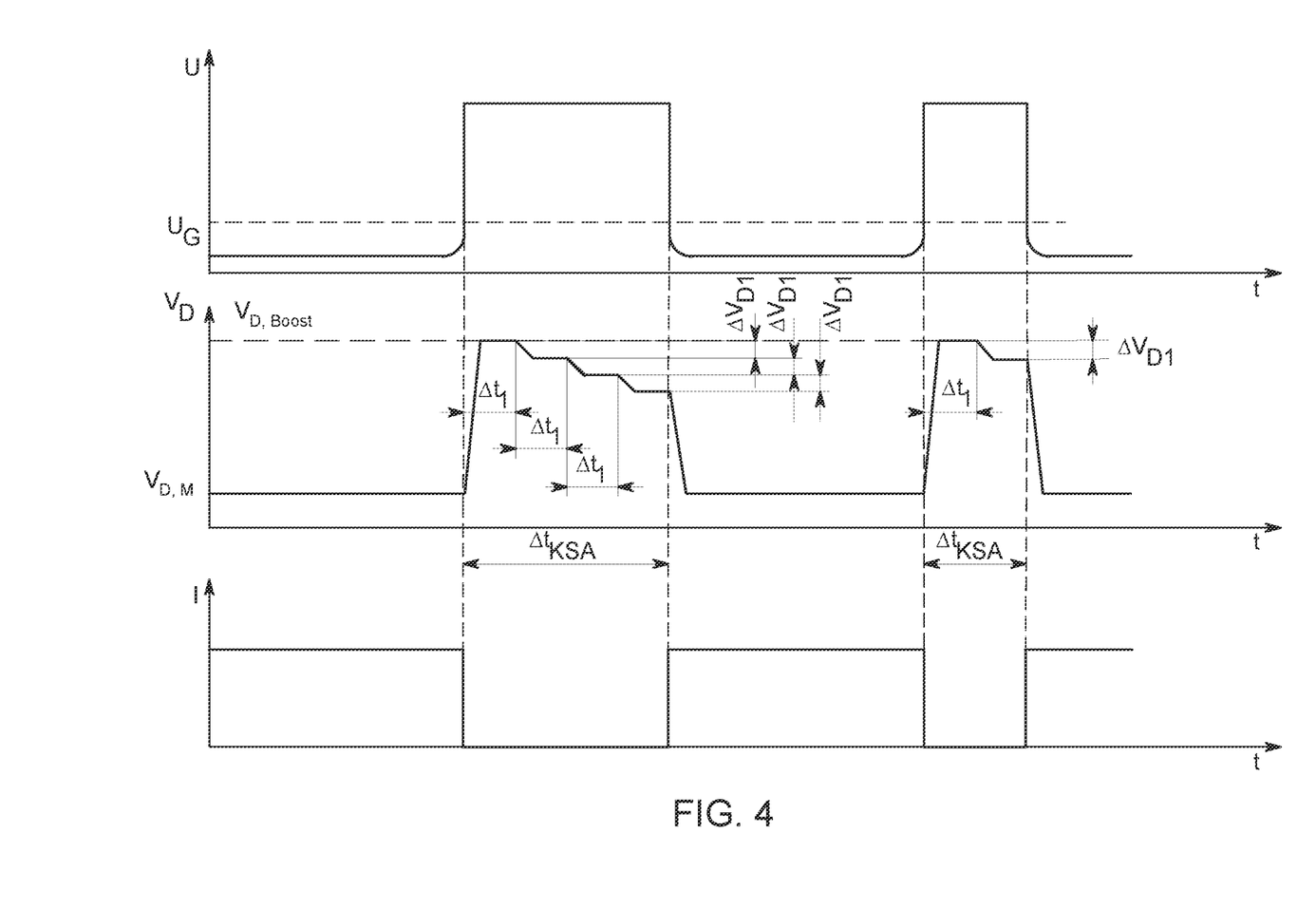
FIG. 4 shows the time profiles of the voltage, the conveyance speed and the current on the wire according to a third embodiment of the invention.

FIG. 4 shows the time profiles of the voltage U, of the conveyance speed $v_D$ and of the current I on the wire 4 according to a third embodiment of the invention, the conveyance speed $v_D$ being reduced in a plurality of stages until the short-circuiting can be terminated after the duration $\Delta t_{KSA}$ has elapsed. In contrast to the exemplary embodiment according to FIG. 3, this exemplary embodiment shows a multi-stage method for reducing the conveyance speed $v_D$. The second short-circuiting shown is shorter, which is why here the boost speed $v_{D,Boost}$ is reduced only once by the predetermined conveyance speed amount $\Delta v_{D1}$ before the short-circuiting after the duration $\Delta t_{KSA}$ is ended.

Figure 5:
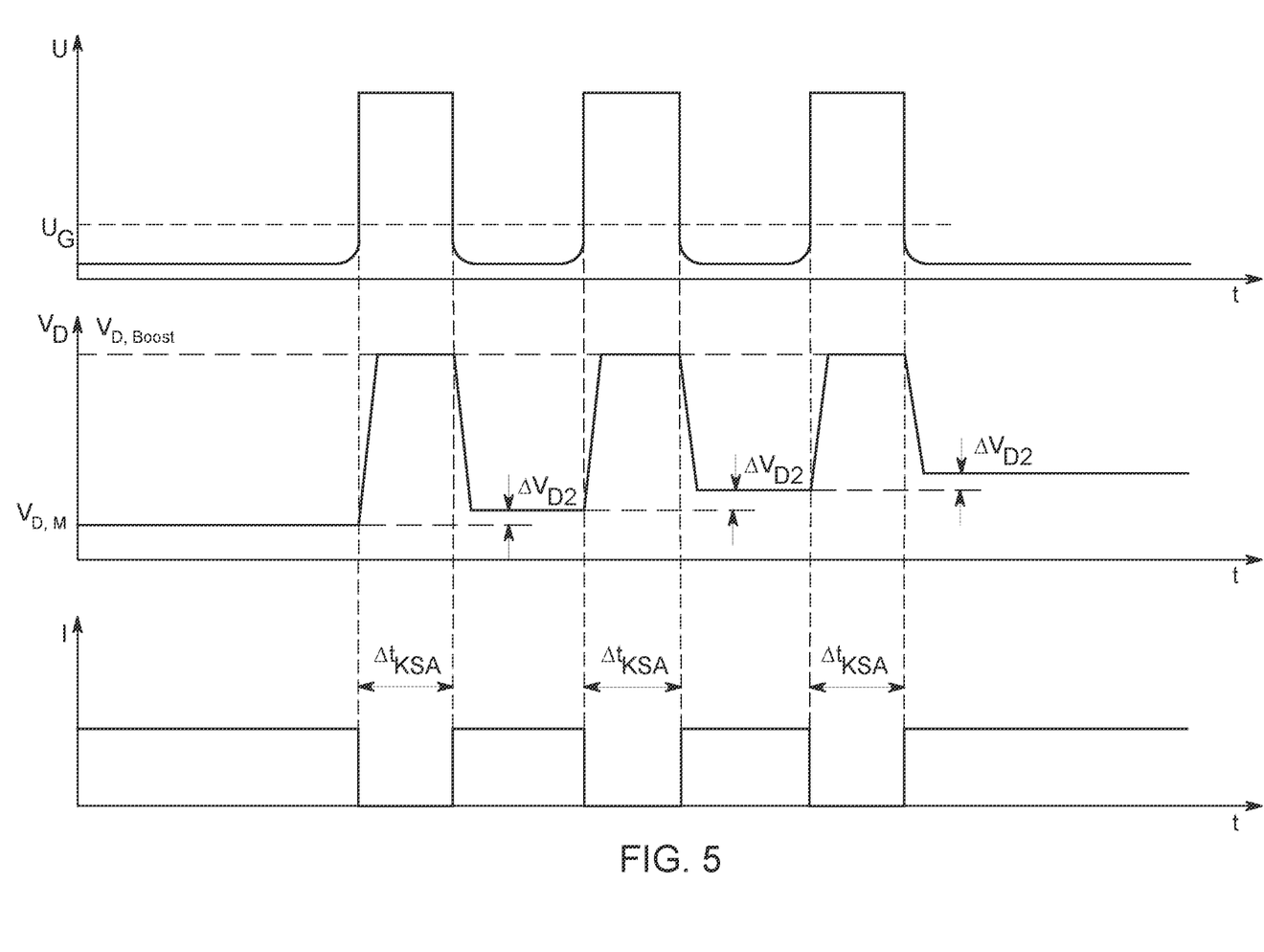
FIG. 5 shows the time profiles of the voltage, the conveyance speed and the current on the wire according to a fourth embodiment of the invention.

In FIG. 5, the time profiles of the voltage U, the conveyance speed $v_D$ and the current I on the wire 4 according to a fourth embodiment of the invention are represented. According to a variant, the conveyance speed $v_D$ is reduced here to a mean conveyance speed $v_{D,M}$ increased by a predetermined conveyance speed amount $\Delta v_{D2}$ after the short-circuit has been restored after the duration $\Delta t_{KSA}$ has fallen below the voltage limit value $U_G$. Through this up-regulation of the mean conveyance speed $v_{D,M}$ after the short-circuiting, an adaptation of the process can be achieved, as a result of which future short-circuiting can be better prevented.

Figure 6:
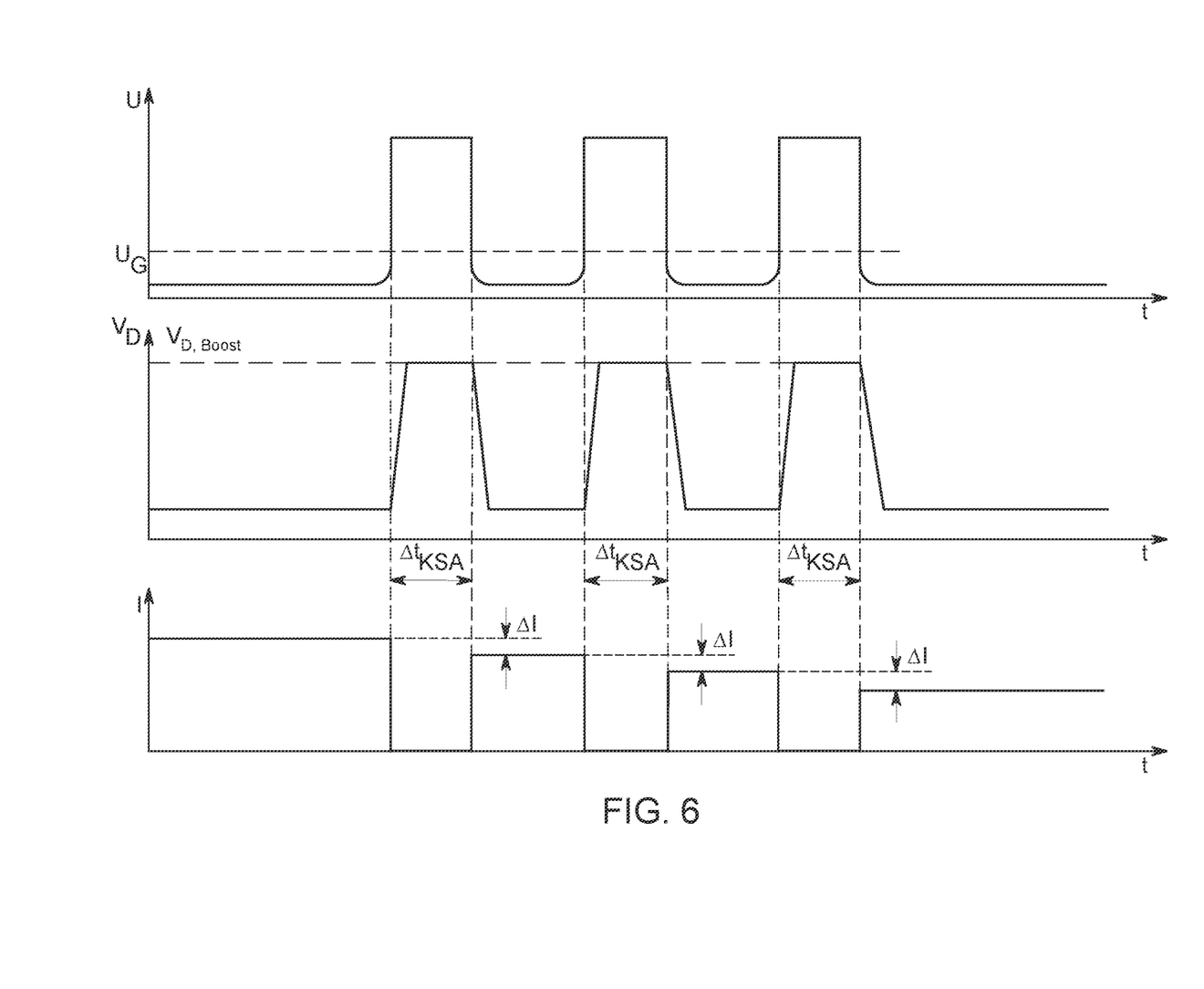
FIG. 6 shows the time profiles of the voltage, the conveyance speed and the current on the wire according to a fifth embodiment of the invention.

In FIG. 6, the time profiles of the voltage U, the conveyance speed $v_D$ and the current I on the wire 4 according to a fifth embodiment of the invention with a preheating of the wire 4 are represented. Here, the current I is regulated or controlled by the wire 4 in such a way that the current I is reduced, for example, by a predetermined current amount $\Delta I$ after the short-circuiting, that is to say after the increase of the conveyance speed $v_D$ to the boost speed $v_{D,Boost}$. This measure, which can also be combined with the embodiment variant shown in FIG. 5, also achieves a corresponding adaptation of the process and prevents future short-circuiting.

Figure 7:
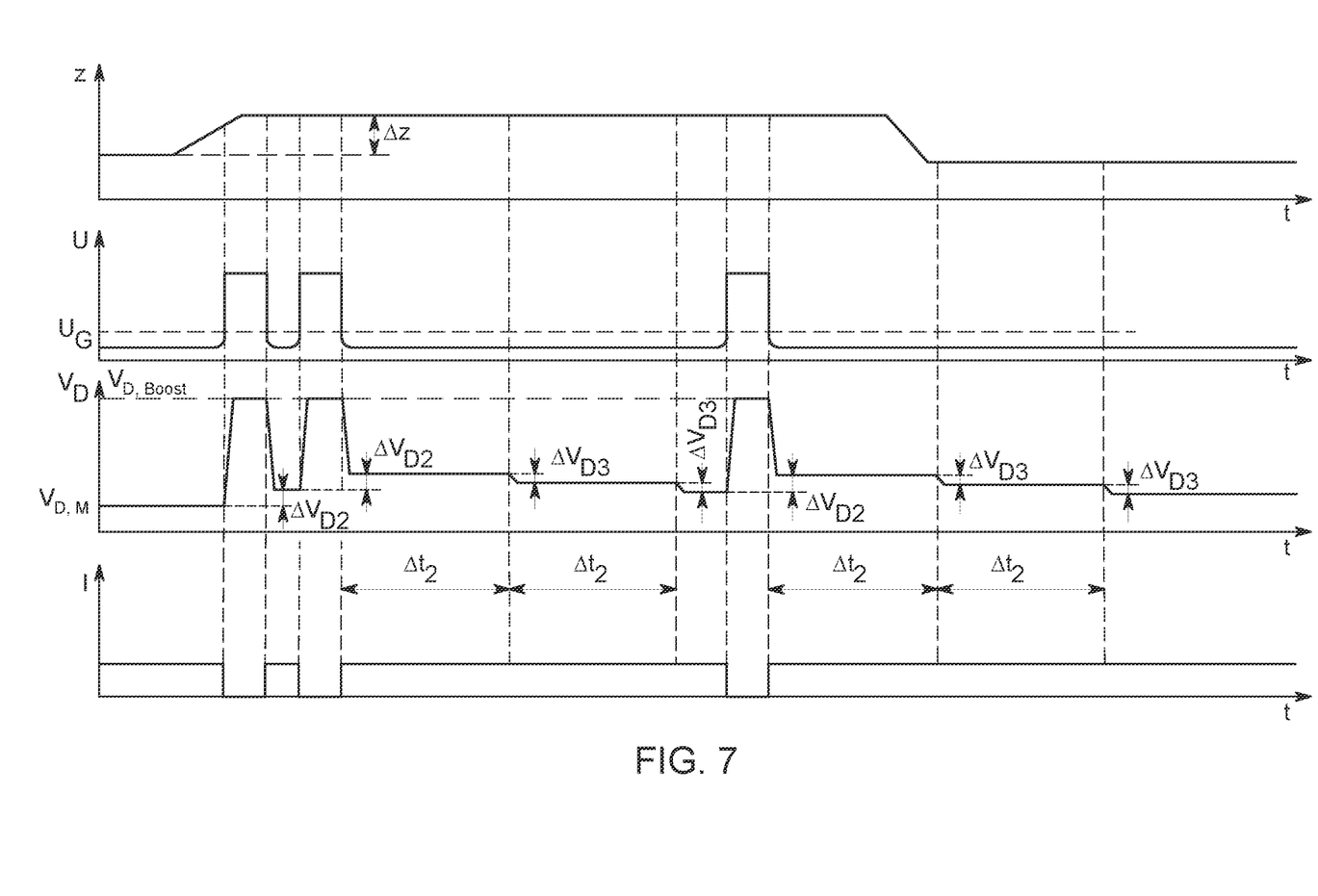
FIG. 7 shows the time profiles of the position of the soldering or welding head in z-direction, the voltage, the conveyance speed and the current on the wire according to a sixth embodiment of the invention.

FIG. 7 shows the time profiles of the z-position of the soldering or welding head in vertical direction with respect to the workpiece 5, the voltage U, the conveyance speed $v_D$ and the current I on the wire 4 according to a sixth embodiment of the invention. As can be seen from the course of the uppermost time diagram of the z-position, the position is changed by the height $\Delta z$ and subsequently the z-position is reduced again. Upon detection of a short-circuiting, as already described with reference to the exemplary embodiment according to FIG. 5, after a restoration of the short-circuit after the duration $\Delta t_{KSA}$, the conveyance speed $v_D$ is reduced to a mean conveyance speed $v_{D,M}$ increased by a predetermined conveyance speed amount $\Delta v_{D2}$. In addition, after a defined period of time $\Delta t_2$ has elapsed, the mean conveyance speed $v_{D,M}$ after the short-circuiting is reduced at least once by a predetermined conveyance speed amount $\Delta v_{D3}$, until the mean conveyance speed $v_{D,M}$ is reached again. Due to the stepwise increase in the mean conveyance speed $v_{D,M}$ after each boost process, the probability of new short-circuiting can be reduced. After a certain period of time $\Delta t_2$, the mean conveyance speed $v_{D,M}$ is again successively lowered to the originally set value. If the disturbance of the z-position is still present at the time of reaching the original mean conveyance speed $v_{D,M}$, a short-circuiting occurs again with a boost process followed by a further increase in the mean conveyance speed $v_{D,M}$.

Figure 8:
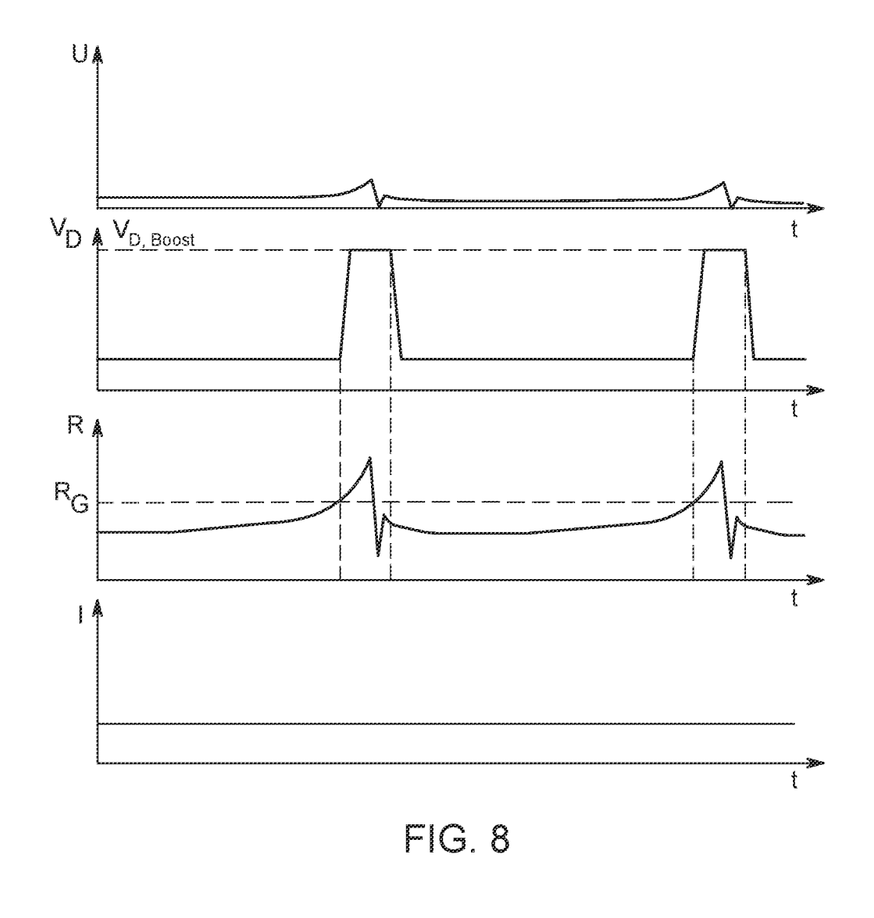
FIG. 8 shows the time profiles of the voltage, the conveyance speed, the resistance, and the current on the wire according to a further embodiment of the invention.
Figure 9:
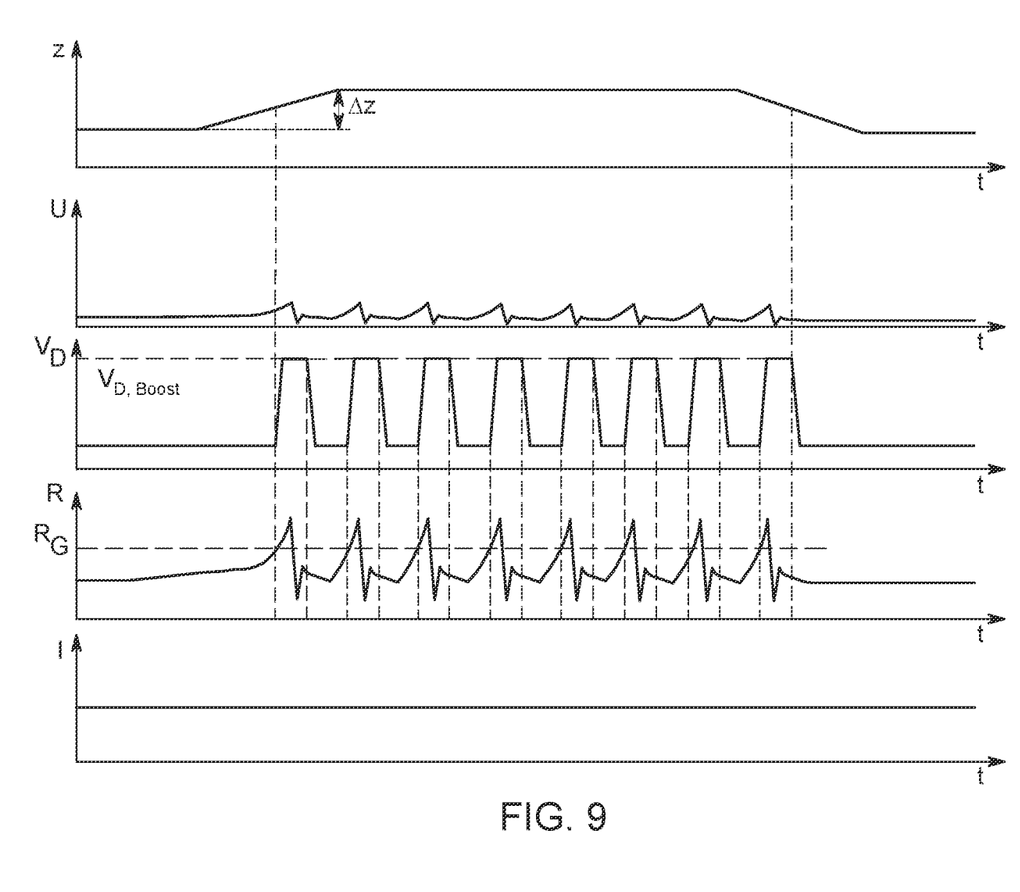
FIG. 9 shows the time profiles of the position of the soldering or welding head in the z-direction, the voltage, the conveyance speed, the resistance and the current on the wire according to a further embodiment of the invention.

FIG. 8 shows the time profiles of the voltage U, the conveyance speed $v_D$, the resistance R and the current I on the wire 4 according to a further embodiment of the invention. In this case, in addition to the voltage U, the current I is also detected and the resistance R is calculated therefrom, and this is evaluated in real time. Since, before the actual short-circuiting, a firstly slow and then steeply rising resistance R occurs, this rise or else the rate of change of the resistance R can also be monitored. If the resistance R exceeds a predetermined resistance limit value $R_G$, the boost process can likewise be triggered with the increased boost speed $v_{D,Boost}$. The advantage of this regulation or control variant is that, in the ideal case, the short-circuiting can be completely prevented here. Thus, at no time does the melting bath bridge or the short circuit between the wire 4 and the workpiece 5 break open. The influence on the soldering process or welding process and on the finished soldering or welding seam is the lowest here. FIG. 9 shows the time profiles of the z-position of the soldering or welding head in vertical direction, the voltage U, the conveyance speed $v_D$, the resistance R, and the current I on the wire 4 according to a further embodiment of the invention. At the beginning, the laser soldering or laser welding process proceeds in a stable manner and without disturbances with a defined conveyance speed $v_D$ and a defined current I for preheating the wire 4. The voltage U is approximately zero. If the z-position is increased by a change in the height $\Delta z$, short-circuiting would occur at a still constant conveyance speed $v_D$. By measuring the voltage and the current I, calculating a resistance R and observing the exceeding of a resistance limit value $R_G$, the short-circuiting can be effectively prevented according to the method described in FIG. 8. After the return of the laser or welding head to the original z-position, there are no increases in the voltage U or the resistance R and thus no boosting processes, and the laser soldering or laser welding process runs stably again.

Figure 10:
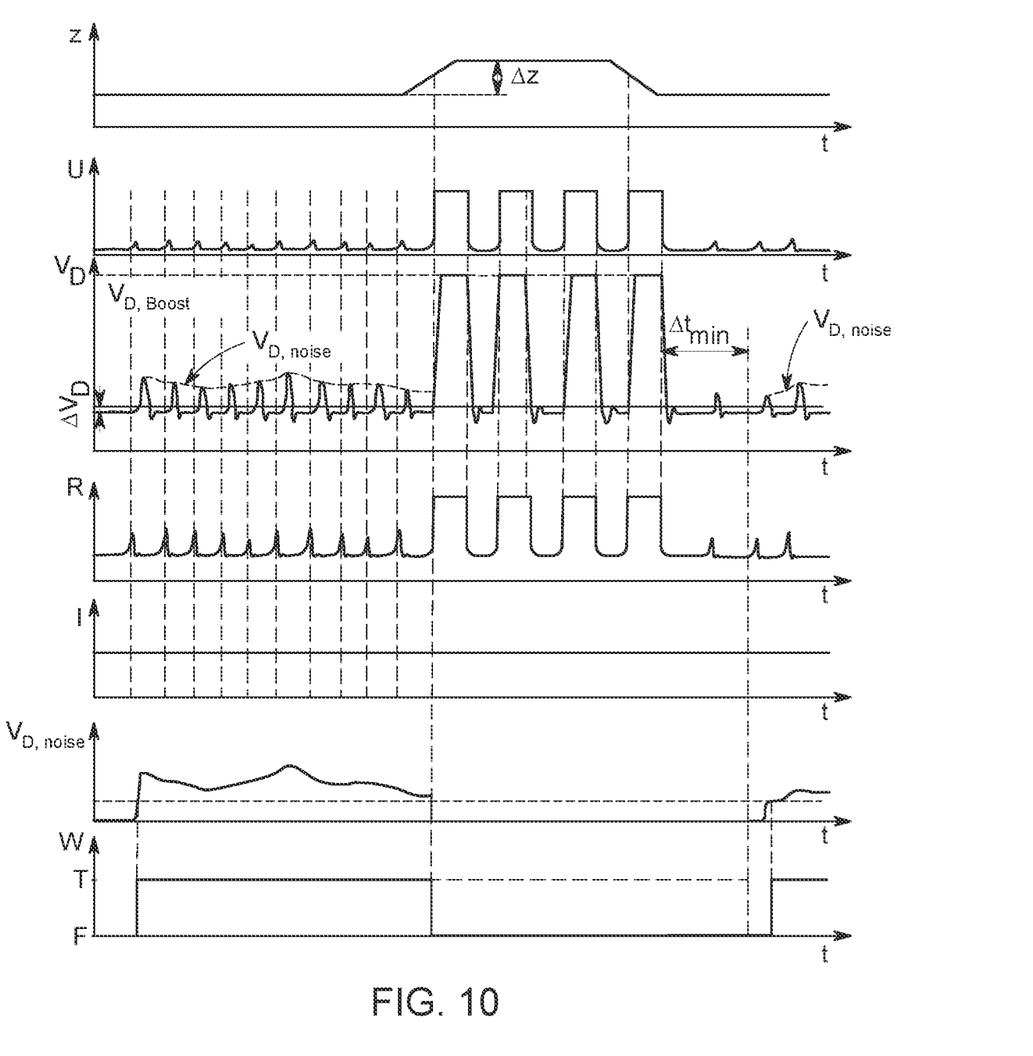
FIG. 10 shows the time profiles of the position of the soldering or welding head in the z-direction, the voltage, the conveyance speed, the resistance, the current on the wire, a determined noise signal and a warning signal when a certain noise signal threshold is exceeded, according to a further embodiment of the invention.

Finally, FIG. 10 shows the time profiles of the z-position, of the voltage U, the conveyance speed $v_D$, the resistance R, the current I on the wire 4, of a determined noise signal $v_{D,noise}$ and of a warning signal when a certain noise signal threshold $v_{D,noise,S}$ is exceeded, according to another embodiment of the invention. In this case, the current conveyance speed $v_D$ is additionally monitored for disturbances or signal noise. By means of a preferably highly dynamic conveyance device for the wire 4, which is preferably coupled directly to the wire 4 without a transmission, it becomes possible to detect even the slightest disturbances in the conveyance speed $v_D$ and then to evaluate them accordingly. On the one hand, monitoring such short interference peaks also makes sense in principle without the use of the short-circuit stabiliser according to the invention, since the noise signal $v_{D,noise}$ generated therefrom provides information about the general quality of the conveyance of the wire 4, and accordingly a warning signal W for a possible process stop can also be generated. On the other hand, for a stable function of the boost process in the variant with the evaluation of the resistance R, it is expedient or even necessary also to evaluate and take into account the noise signal $v_{D,noise}$. Due to certain disturbances in the conveying path of the wire 4 or incorrect settings, similar courses of the voltage U or of the resistance R can occur as in the case of an imminent short-circuiting. This would falsely trigger a boost process. This can be prevented by an additional evaluation of the noise signal $v_{D,noise}$, and only actual short-circuit occurrences are identified. If the noise signal $v_{D,noise}$ exceeds a noise signal threshold $v_{D,noise,S}$, a warning signal W can be output. This error makes it possible to draw conclusions about the quality of the conveyance of the wire 4 and, if necessary, the process can also be stopped. A further function of this warning signal W would be the automatic switching of the triggering algorithm for the short-circuit stabiliser. If the warning signal W stands for "FALSE" at F, the faster and more effective algorithm can be used by evaluating the course of the resistance R. If the warning signal is set to T for "TRUE", the evaluation of the course of the resistance R does not work or does not work optimally, and the triggering algorithm is used via the detection of the actual short-circuiting via the voltage U. By changing the z-position of the workpiece 5 or robot, the melting bath bridges between the wire 4 and the workpiece 5 or melting bath can be torn open. The warning signal W is set to T for "TRUE", thus the boost process is triggered by the measurement of the voltage U. The generation of the noise signal $v_{D,noise}$ is preferably deactivated for the duration of the boost processes and restarted only after a certain waiting time $\Delta t_{min}$ has elapsed for settling of all signal progressions.

The invention claimed is:

1. A method for regulating or controlling the conveyance speed ($v_D$) of a wire (4) composed of consumable material during a laser soldering or laser welding method, wherein the wire (4) is melted by a laser beam (L) from a laser unit (2) and is conveyed at a mean conveyance speed ($v_{D,M}$) in the direction of a workpiece (5) to be processed, wherein a voltage (U) between the wire (4) and the workpiece (5) is measured, wherein, as a function of the measured voltage (U), the conveyance speed ($v_D$) of the wire (4) is temporarily increased to a predetermined boost speed ($v_{D,Boost}$), which is on average at least 50% above the mean conveyance speed ($v_{D,M}$) before the increase, by increasing the conveyance speed ($v_D$) to the predetermined boost speed ($v_{D,Boost}$) when a defined voltage limit value ($U_G$) is exceeded, and reducing the conveyance speed ($v_D$) again at the latest when the voltage limit value ($U_G$) falls below.

2. The method according to claim 1, wherein the conveyance speed ($v_D$) is increased to a predetermined boost speed ($v_{D,Boost}$) which is at least 10 m/min, the conveyance speed ($v_D$) preferably being increased with a speed change ($\Delta v_D/\Delta t$) of at least 2000 m/min/s.

3. The method according to claim 1, wherein, in order to preheat the wire (4), a current (I) is supplied to the wire (4), and a resulting voltage ($U_M$) is measured, and the conveyance speed ($v_D$) is temporarily increased to the predetermined boost speed ($v_{D,Boost}$) as a function of this measured voltage ($U_M$).

4. The method according to claim 3, wherein the current (I) through the wire (4) is additionally measured, and a resistance (R) is determined from the measured voltage ($U_M$) and the measured current (I), and, if a resistance limit value ($R_G$) is exceeded, the conveyance speed ($v_D$) is increased to the predetermined boost speed ($v_{D,Boost}$), and in that wherein the conveyance speed ($v_D$) is reduced again at the latest when the resistance limit value ($R_G$) falls below.

5. The method according to claim 1, wherein the conveyance speed ($v_D$) is reduced at least once by a predetermined conveyance speed amount ($\Delta v_{D1}$) for a predetermined period of time ($\Delta t_1$) after the increase to the boost speed ($v_{D,Boost}$).

6. The method according to claim 1, wherein the conveyance speed ($v_D$) is again reduced to the mean conveyance speed ($v_{D,M}$) before the increase when the voltage limit value ($U_G$) or the resistance limit value ($R_G$) falls below.

7. The method according to claim 1, wherein the conveyance speed ($v_D$) is reduced to a mean conveyance speed ($v_{D,M}$) increased by a predetermined conveyance speed amount ($\Delta v_{D2}$) when the voltage limit value ($U_G$) or the resistance limit value ($R_G$) falls below.

8. The method according to claim 7, wherein the mean conveyance speed ($v_{D,M}$) increased by the conveyance speed amount ($\Delta v_{D2}$) is reduced at least once after a defined period of time ($\Delta t_2$) has elapsed by a predetermined conveyance speed amount ($\Delta v_{D3}$), until the mean conveyance speed ($v_{D,M}$) is reached again.

9. The method according to claim 1, wherein the current (I) is regulated or controlled by the wire (4) by reducing the current (I), after increasing the wire conveyance speed ($v_D$), to the boost speed ($v_{D,Boost}$), preferably by a predetermined current amount ($\Delta I$).

10. Method according to claim 1, wherein the conveyance speed ($v_D$) of the wire (4) is detected and a noise signal ($v_{D,noise}$) is generated therefrom, and, if a noise signal threshold ($v_{D,noise,S}$) is exceeded, the regulation or control of the conveyance speed ($v_D$) is deactivated.

11. The method according to claim 10, wherein a warning is issued when the noise signal threshold ($v_{D,noise,S}$) is exceeded.

12. A laser soldering or laser welding device (1), comprising a laser unit (2) for melting a wire (4) of consumable material, a wire conveyance device (3) for conveying the wire (4) at a conveyance speed ($v_D$) in the direction of a workpiece (5) to be processed, and a circuit for measuring the voltage (U) between the wire (4) and the workpiece (5), wherein the laser soldering or laser welding device (1) comprises a regulating or control device (6) which is designed to carry out the method according to claim 1.

13. The laser soldering or laser welding device (1) according to claim 12, wherein the wire conveyance device (3) is formed by a gearless direct drive.

14. The laser soldering or laser welding device (1) according to claim 12, wherein the wire conveyance device (3) for conveying the wire (4) is designed with a conveyance speed of at least 10 m/min, preferably with a speed change ($\Delta v_D/\Delta t$) of at least 2000 m/min/s.

\* \* \* \* \*